UNITED STATES PATENT OFFICE.

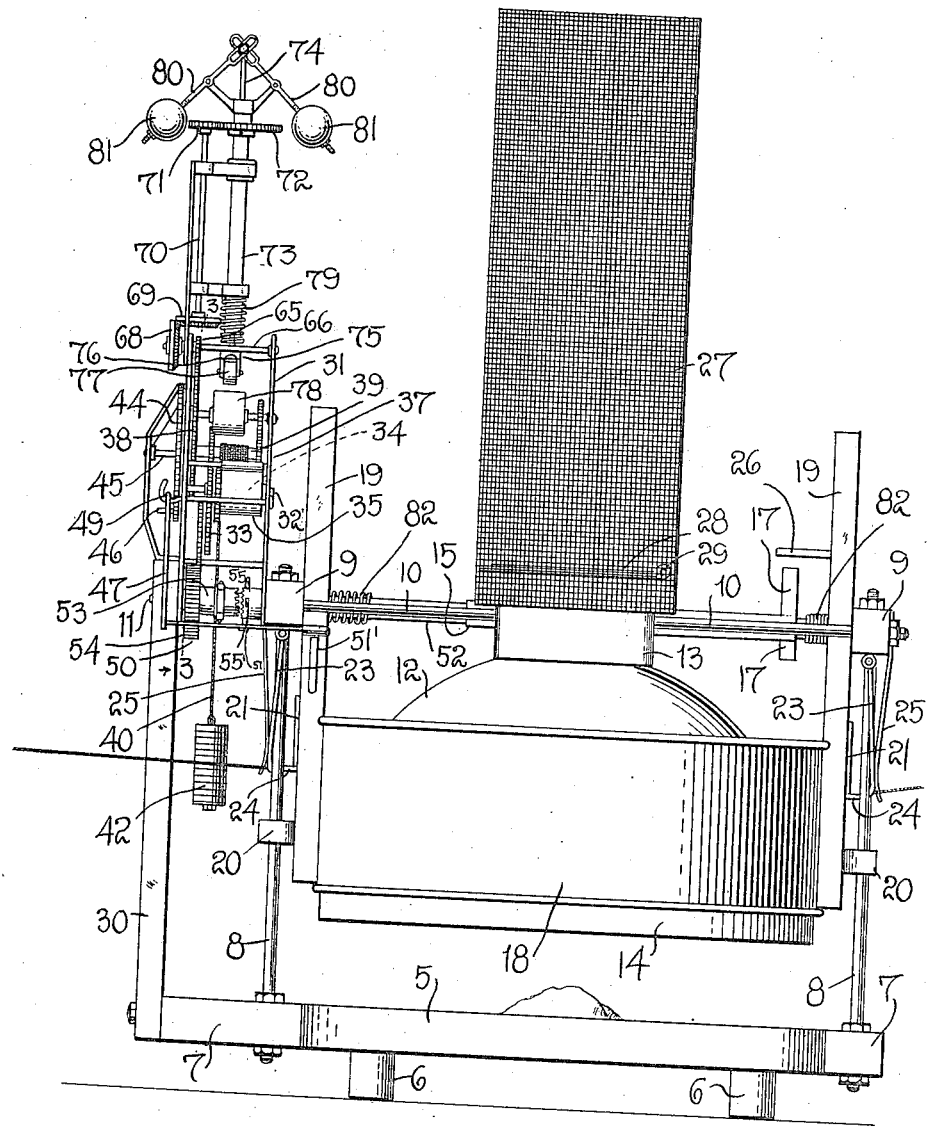

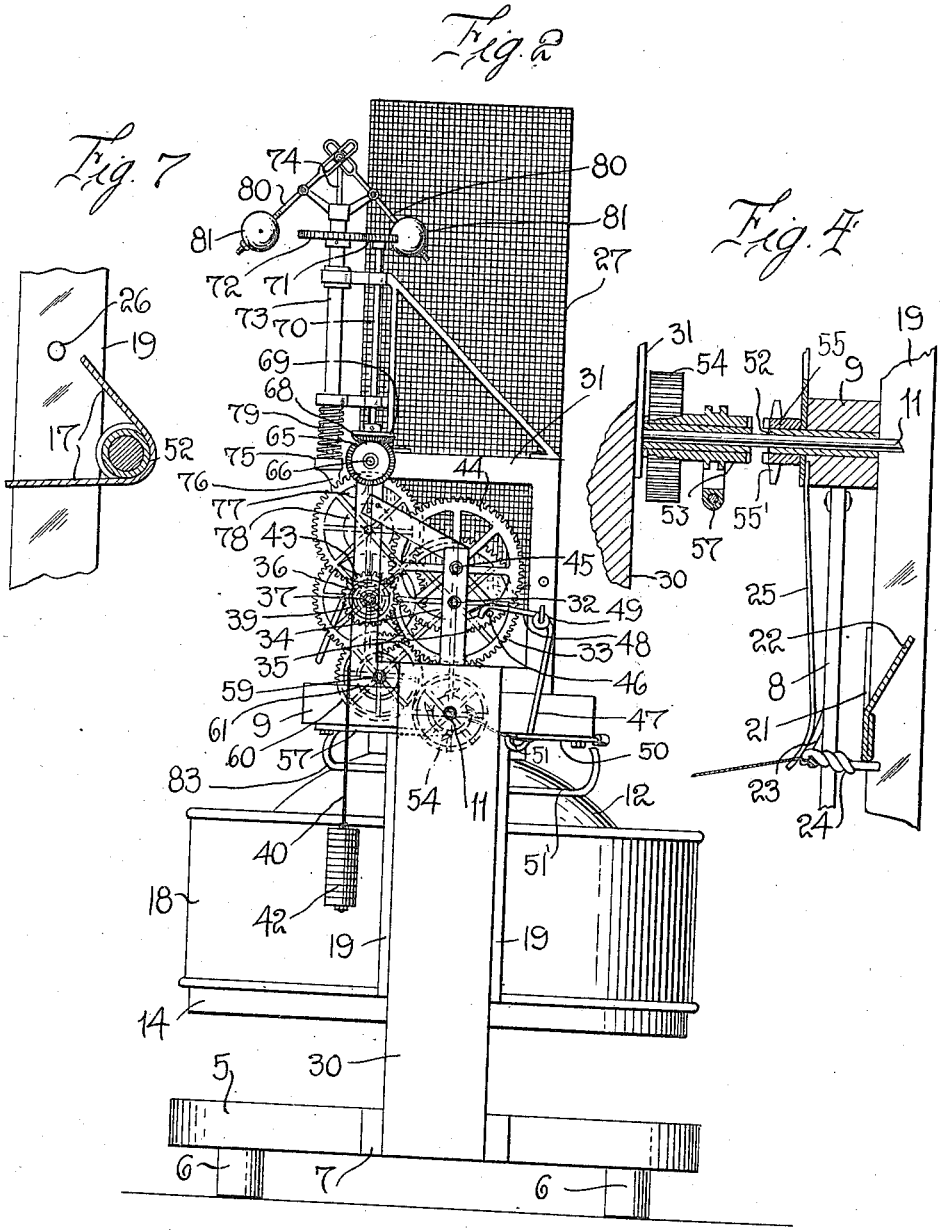

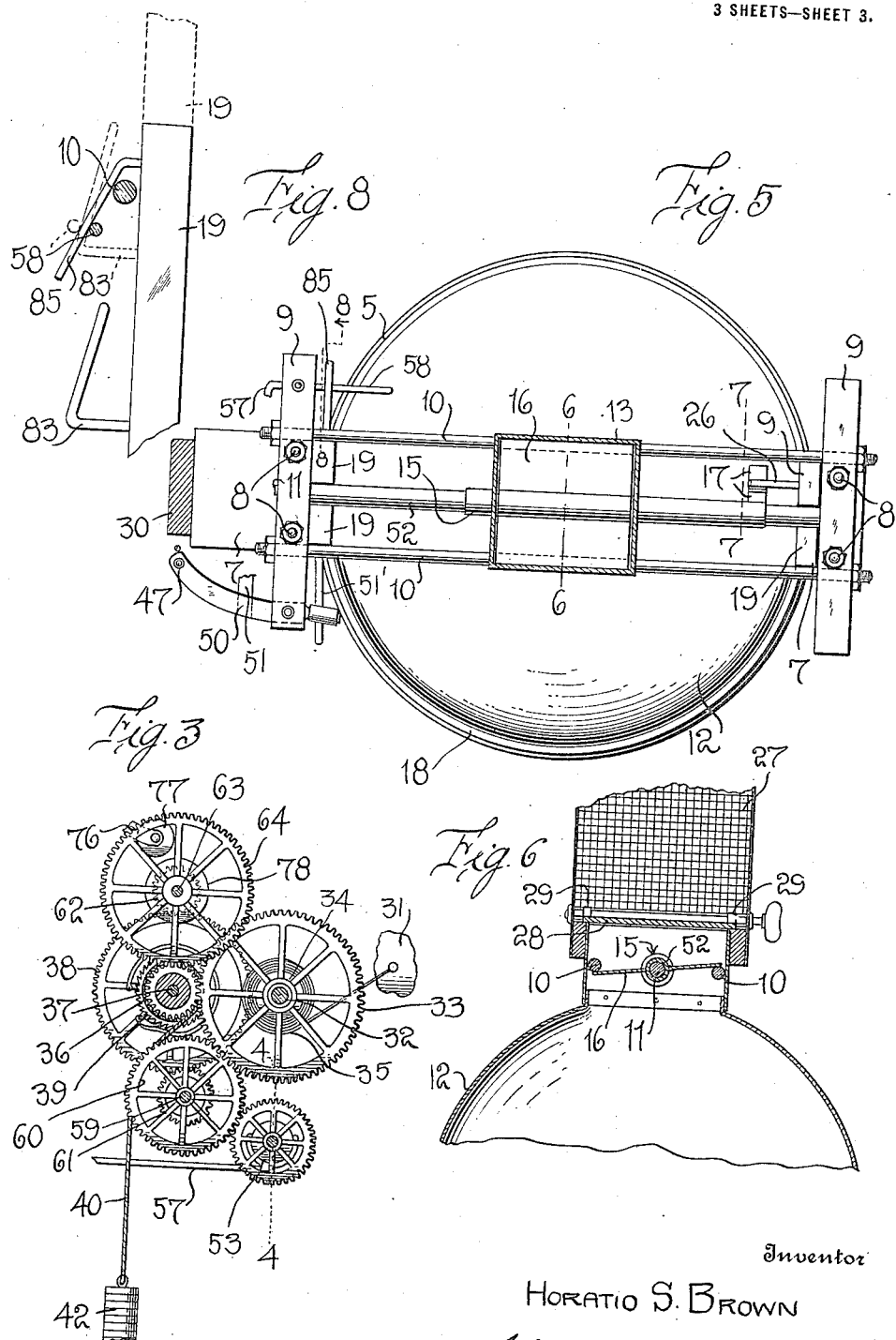

HORATIO S. BROWN, OF WILLIAMS, MINNESOTA.

INSECT-TRAP.

1,232,762.

Specification of Letters Patent.

Patented July 10, 1917.

Application filed March 10, 1917. Serial No. 153,958.

*To all whom it may concern:*

Be it known that I, HORATIO S. BROWN, a citizen of the United States, residing at Williams, in the county of Beltrami and State of Minnesota, have invented certain new and useful Improvements in Insect-Traps, of which the following is a specification, reference being had to the accompanying drawings.

This invention relates to fly traps and has for its primary object to provide a device for trapping flies and other insects, whereby the insects are securely trapped or caught, the device being automatically actuated at predetermined intervals.

It is a more particular object of the invention to provide a trap of the above character including a relatively stationary, transparent cone having a valved opening at its top and base above which the cone is supported, a vertically movable, annular wall surrounding the lower open end of the cone, means whereby the valved closure for the opening in the top of the cone is closed when said wall is raised, and opened when the wall is lowered upon the base.

It is another important object of the invention to provide a governor-controlled, automatically operating mechanism for raising and lowering said vertically movable wall at predetermined intervals.

The invention also has for a further general object to improve and simplify the construction of devices of the above character, render the same reliable and positive in operation, and capable of manufacture at relatively small cost.

With the above and other objects in view, my invention consists in the novel features of construction, combination, and arrangement of parts to be hereinafter more fully described, claimed and illustrated in the accompanying drawings, in which, Figure 1 is a side elevation of a fly or insect trap constructed in accordance with the preferred embodiment of my invention;

Fig. 2 is a view looking at right angles to Fig. 1, showing the trip machanism;

Fig. 3 is a vertical section taken on the line 3—3 of Fig. 1;

Fig. 4 is a section taken on the line 4—4 of Fig. 3;

Fig. 5 is a plan view with the insect receiver removed;

Fig. 6 is a section taken on the line 6—6 of Fig. 5;

Fig. 7 is a vertical sectional view on the line 7—7 of Fig. 5; and

Fig. 8 is a detail section taken on the line 8—8 of Fig. 5.

Referring in detail to the drawings, 5 designates a base, preferably of circular form in plan, which is supported by means of a plurality of spaced feet or standards 6. This base is provided at diametrically opposite points with radial extensions 7 in each of which the lower ends of spaced, vertical rods 8 are fixed. The upper ends of these rods are connected by the bars 9, and said bars in turn are connected to each other by the spaced, horizontal rods 10. An additional rod 11 is arranged centrally between the rods 10 and extends through the bars 9.

The upper, truncated end of a transparent cone 12 is secured to a rectangular, sheet metal wall or plate 13 through which the parallel rods 11 extend, whereby the cone is supported above the base 5. The lower edge of the transparent wall of this cone is strengthened or reinforced by an annular, metal band 14. A metal sleeve 15 is loosely engaged upon the central rod 12 and extends through openings in the sides of the wall 13, and to said sleeve a valve or closure plate 16 is secured, said plate being disposed within the rectangular wall 13 and adapted to open and close the top of the cone 12. One end of the sleeve 15 is provided with arms 17 projecting at right angles with respect to each other. The purpose of these arms will be hereinafter explained.

A circular sheet metal wall 18 surrounds the cone 12 and is adapted for vertical movement with respect thereto. To the opposite sides of this wall and to the exterior thereof, the spaced uprights 19 are secured, said uprights extending between the outer rods 10 and the central rod 11. To each of the uprights 19, spaced guides 20 which may be in the form of eyes or other suitable elements to loosely engage the respective rods 8 which are fixed to the base 5, are secured. A plate 21 is also secured to each pair of uprights 18 and is provided with an angularly disposed tongue 22 projecting inwardly between the uprights over the upper edge of the wall 18. A latch element 23 in the form of a wire rod, is loosely connected at its terminals to the under side of each of the bars 9 and has its intermediate portion twisted together and angularly disposed inwardly, as at 24. This angular arm is adapted for engagement beneath the lower edge of one of the plates 20 and is yieldingly urged inwardly by a leaf spring 25 fixed at its upper end to the bar 9 and bearing at its free end against the latch rod 23. The latch rods 23 are adapted to be operated by hand, and suitable flexible elements may be connected to these latch rods for their convenient operation.

To one of the uprights 8, a rod or pin 26 is fixed and is adapted for engagement with the arms 17 on the end of the sleeve 16.

A receiver or container for the flies or other insects, indicated at 27, has its body walls constructed of wire mesh or other reticulated material, and the open end of this receiver is adapted to be closed by a plate 28 which is hingedly mounted at one of its ends, as at 29, at one side of the opening in the end of the receiver. This opening receives the upper end of the vertical, rectangular wall 13 and frictionally engages the outer side of said wall to support the receiver in a vertical position.

As thus far explained, it will be understood that when the circular wall 18 is raised above the base 5, the arms 24 of the latch members 23 engage beneath the lower edges of the plates 20 and support the wall 18 in such raised position. In this upward movement of the wall 18, the pin 26 strikes one of the arms 17 on the end of the sleeve 15 and rotates said sleeve so that the plate 16 is disposed in a horizontal position and the entrance into the receiver 27 thus closed. Food or other suitable bait is placed upon the center of the base 5 beneath the cone 12, to attract the flies or other insects. When the flies have accumulated upon the base, the latch devices 23 are pulled outwardly against the action of the springs 25, thereby releasing the circular wall 18 so that it will drop downwardly by gravity and rest upon the base. The insects then fly upwardly toward the bait which is visible through the walls of the transparent cone, and as the closure plate 16 has been turned to its open position by the rod or pin 26 striking the other of the arms 17, the insects may fly upwardly into the receiver 27. The hinge rod of the plate 28 projects at one end through the wall of this receiver and may be readily rotated to lower the plate to closed position across the open end of the container, thereby trapping the flies in the receiver. The receiver may now be removed and the flies disposed of in any desired manner. I have also devised an improved mechanism for automatically raising and lowering the wall 18 at predetermined times and, of course, when this mechanism is in use, the latch rods 23 are fixed or held in any suitable manner in an inoperative position.

An upright 30 is fixed to one of the arms 7 projecting from the base 5, and upon the upper end of this upright and the adjacent bar 9, a suitable frame 31 is mounted. In this frame, the actuating mechanism for the vertically movable wall 18 is supported. This mechanism includes a main shaft 32 upon which the gear wheel 33 is fixed. A drum 34 is loosely mounted upon said shaft and connected at one of its ends to the gear wheel 32 by a suitable pawl and ratchet. This drum is actuated through the medium of the spiral spring 35 or other equivalent means. The gear 32 meshes with a pinion 36 on a second shaft 37. A large gear wheel 38 is also fixed upon said shaft and a loosely mounted drum 39 connected by a pawl and ratchet to said gear wheel for rotation therewith in one direction. A cord 40 is connected to the drum and has a weight 42 attached to the other end thereof. On the end of the shaft 37, exteriorly of the frame 30, a gear 43 is fixed to mesh with a larger gear wheel 44 geared upon a shaft 45 mounted in the frame. This wheel carries a plurality of outwardly projecting pins or studs 46 which are adapted to engage the angular arm 48 of a rod 47 pivotally mounted upon the frame 30, as at 49. The lower end of this rod is connected to a plate 50 fulcrumed intermediate of its ends upon the under side of the bar 9. To this plate 50, intermediate of its ends, an inwardly projecting arm 51 is fixed for a purpose which will be presently stated.

A tube 52 is engaged upon the central rod 11 and extends through the tube 15 carrying the plate 16. One end of this tube is square or rectangular in form and, upon the rod 11, the clutch member 53 is slidably engaged. A gear 54 is fixed to one end of this clutch member. A complementary clutch member 55 is fixed upon the square end of the tube 52, and carries a relatively large gear 56. The members 53 and 55 are provided upon their opposed faces with the usual co-acting clutch teeth and the member 55 also has spaced teeth 55' preferably four in number, formed upon its periphery. These teeth are engaged by the arm 51, as will be hereinafter more fully explained. A rod 57 has a yoke on one end engaged with the sliding clutch member 53, said rod having an angular end portion indicated at 58, which is pivoted upon the under side of the bar 9. A shaft 59, mounted in the frame, is provided with gears 60 and 61 of relatively different diameters on its opposite ends, the gear 60 meshing with the gear 54 while the gear 61 is engaged with the gear 38. It will be understood that the teeth of the gear 54 are sufficiently wide so that they will at all times remain in mesh with the gear 60 when the clutch member 53 is shifted into or out of operative relation to the clutch member 55.

The gear 38 meshes with a pinion 62 fixed on the shaft 63, and this shaft carries a relatively large gear 64 which meshes with a pinion 65 on the shaft 66, whereby this latter shaft is driven at a relatively high speed. This shaft 66 has a beveled gear 68 secured thereon to mesh with a gear 69 on the lower end of the vertical shaft 70. A gear 71, fixed to the upper end of this shaft, meshes with a gear 72 secured upon a tubular shaft 73 suitably supported on the frame 31. A governor actuated rod 74 is longitudinally movable through the tubular shaft 73, and on its lower end is provided with a head 75 from which an annular arm 76 projects and in which arm the wheel 77 is mounted. This wheel is adapted to exert bearing frictional pressure upon a similar wheel 78 fixed upon the shaft 63. A spring 79 is secured at its upper end to a brace or bearing through which the shaft 73 extends and is connected at its lower end upon the head 75. This spring normally holds the wheel 77 out of frictional engagement with the wheel 78. Arms 80 are pivotally supported upon opposite sides of the shaft 73 at its upper end and have a relative sliding connection at their inner ends to the upper end of the rod 74. The outer end of each of the arms 80 has a governor ball 81 fixed thereto. Thus, it will be seen that the governor operates to maintain a uniform speed of the actuating gearing by applying a brake or check to the rotation of the shaft 63 which, through the gear train, controls the action of the spring 35. To the tube 52, the upper ends of the cords 82 are securely attached, the lower ends of said cords being connected to the circular wall 18 at diametrically opposite sides thereof.

From the foregoing description, the operation of the mechanism will be readily understood. When the spring 35 is wound up and released, the gear train is operated and the tube 52 rotated upon the rod 11 to wind the cords 82 thereon and thus lift the circular wall 18. In this upward movement of the wall, an angular rod 83, fixed to one of the uprights 18, engages the end 58 of the rod 57 and shifts the clutch 53 out of connection with the clutch member 55 so that the gear 54 will rotate loosely upon the rod 11. A rod 51' simultaneously engages one end of the plate 50, whereby the arm 51 is moved inwardly into engagement with the periphery of the clutch member 55. The body of the trap drops slightly until one of the teeth 55' on this clutch member engages the under side of said arm when the sleeve 52 is held against further rotation and the body wall 18 of the trap thus sustained in its raised position. This limited downward movement of the wall is sufficient to dispose the rod 51' out of the path of movement of the end of the plate 50. In the rotation of the wheel 44, one of the pins 46 thereof finally comes into engagement with the angular arm of the rod 47 and actuates the plate 50 to disengage the arm 51 from the peripheral teeth on the clutch member 55, thereby permitting of the rotation of the tube 52 in the downward gravity movement of the wall 18 to its normal position. A second rod 85 on the post or upright 19 engages the clutch shifting rod 57 and again shifts the clutch 53 into connection with the clutch 55. The flies seeking an outlet will fly upwardly against the transparent dome 12, and the plate 16 having been moved to its open position by the pin 26 engaging one of the arms 17, the flies being attracted by the light, will ascend into the removable container 27. It will be understood that the upward movement of the wall 18 is very slow, and there is sufficient slack in the cords 82 so that an appreciable period of time will elapse before the wall is again raised, thereby assuring that all of the flies which have been trapped will first enter the container 27 before the wall is raised. In this manner, the wall 18 is automatically actuated at predetermined intervals of time, according to the number of pins 46 which are secured to the wheel 44. The mechanism as a whole is relatively simple, positive and reliable in its operation, and not liable to get out of order. The trap may be employed for catching various kinds of insects, but is particularly desirable for trapping flies. One winding of the actuating spring for the tripping mechanism will suffice to raise and lower the vertically movable wall 18 many times so that the device will require the attention of the householder only at intervals. I have herein shown and described the preferred construction and arrangement of the parts employed, but in carrying out the invention, it will, of course, be understood that the invention is susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:

1. An insect trap including a base, a cone arranged above the base, a vertically movable wall encircling the lower end of the cone and normally resting upon the base, means for raising and lowering said wall, said cone having an opening at its top, a movable closure for said opening, and means actuated when said vertically movable wall is moved to its raised or lowered position to dispose the closure in its closed and open positions respectively.

2. An insect trap including a base, a cone arranged above said base having an opening in its top, a vertically movable wall encircling the lower end of the cone and normally resting upon the base, means for raising and lowering said wall, a rotatable closure for said opening, and co-acting means operable when the wall is raised or lowered to dispose the closure in its closed and open positions.

3. An insect trap including a base, a transparent cone arranged above the base, a vertically movable wall encircling the lower end of the cone and normally resting upon the base, resilient latch devices to co-act with means on said wall and support the latter in spaced relation to the base, said cone having an opening at its top, a rotatably supported closure for said opening provided with arms projecting at right angles to each other, and means movable with said vertical wall to engage the respective arms when the wall is raised and lowered to dispose said plate in its closed and open positions.

4. A trap of the character described including a base, a trap body mounted above the base and having an open bottom, a vertically movable wall encircling said body and normally resting upon the base, a rotatable shaft, flexible connections between said shaft and the wall, mechanism for actuating said shaft to wind the flexible connections thereon and lift the wall to a position above the base, a trip device co-acting with a part fixed on the shaft to hold the shaft against reverse rotation and retain the wall in its elevated position, and means for actuating the trip device at a predetermined time to release said shaft and permit of the gravity movement of the wall to its normal position upon the base.

In testimony whereof I hereunto affix my signature in the presence of two witnesses.

HORATIO S. BROWN.

Witnesses:
 ANITON LEVONDOSKY,
 A. W. ATWATER.

Copies of this patent may be obtained for five cents each, by addressing the "Commissioner of Patents, Washington, D. C."